March 24, 1953     A. S. KNAPP     2,632,380
SANDWICH GRID
Filed March 10, 1951
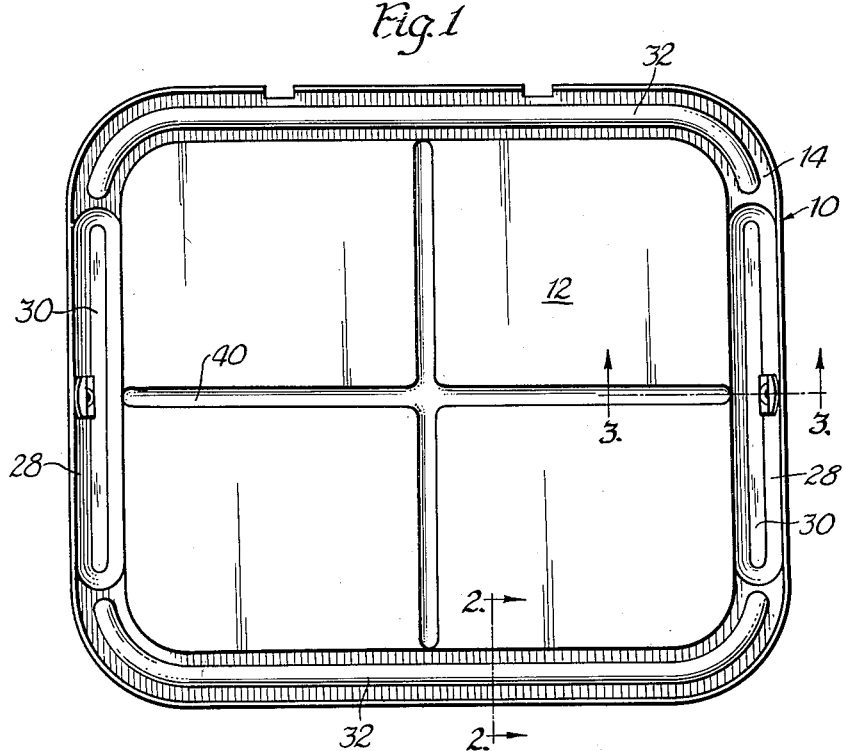
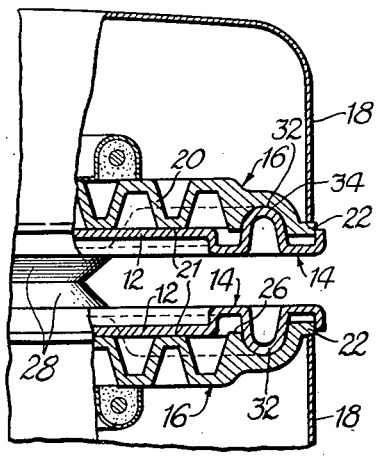
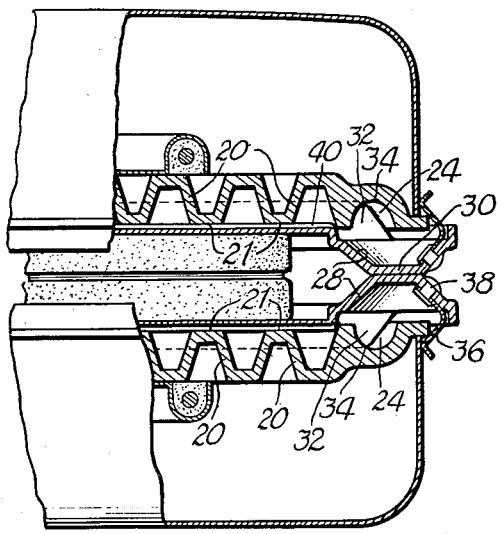
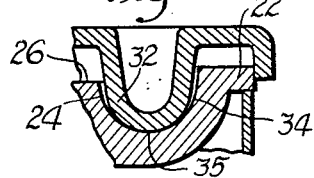
Inventor
Andrew S. Knapp
by Bair, Freeman & Molinare
Attys.

Patented Mar. 24, 1953

2,632,380

UNITED STATES PATENT OFFICE 2,632,380

SANDWICH GRID

Andrew S. Knapp, St. Louis, Mo., assignor to Knapp-Monarch Company, St. Louis, Mo., a corporation of Delaware Application March 10, 1951, Serial No. 214,897

6 Claims. (Cl. 99—376)

1

This invention relates to a sandwich toaster, and more particularly to sandwich toaster grids which may be connected with the grids of an ordinary waffle iron in order to convert it for use as a sandwich toaster. This particular application is directed to an improvement in the sandwich grids described in my patent on a Sandwich Toaster, No. 2,567,382, dated September 11, 1951.

In the sandwich toaster described in my above referred to patent, it was found that the time required to toast a sandwich was lowest when the heat losses between the waffle grids and the sandwich grids was least. When the sandwich grids were first utilized as substantially flat sheet metal attachments to the waffle iron grid, the toasting time for a sandwich was approximately 7 minutes. When these substantially flat sheet metal grids were used, the sandwiches were often crushed by the weight of the upper waffle iron grid. In the sandwich grid described in said patent, embossments were provided along a pair of opposite edges of the sandwich grid to cooperate with similar embossments in the oppositely facing sandwich grid to space the sandwich grids apart and to eliminate the crushing of the sandwich.

These embossments spaced a portion of the border of the sandwich grid further from the face of the waffle iron grid than the remainder of the sandwich grid and thus created a substantially large air pocket between the embossed portions of the sandwich grid and the face of the waffle iron grid. The heat losses due to convection of air within the substantially large air pockets reduced the operating temperature of the sandwich grid and increased the toasting time for sandwiches. For example, the toasting time of the sandwich grid shown in said patent was approximately 10 minutes, and when the length of the embossments in the border of said sandwich grid was doubled, the toasting time for a sandwich increased to 13 minutes.

From the standpoint of sales appeal and efficiency in producing toasted sandwiches, it is desirable to provide a sandwich grid wherein the toasting time is as low as possible and yet to provide sandwich grids wherein the sandwiches will not be crushed. This can be accomplished only by reducing the heat losses between the waffle grid and the sandwich grid.

Furthermore, when there is heat loss from the waffle grid to the air seeping under the edges or border of the sandwich grid, the border of the sandwich grid tends to be cooler than the central portion of the sandwich grid and uneven toasting of the sandwich may result. It is desirable that the temperature gradient of the sandwich grid from the central portion out to the border be as uniform as possible.

Thus, one of the objects of this invention is to provide a sandwich grid wherein the heat losses between the waffle grid and the sandwich grid are reduced.

Another object of this invention is to provide a sandwich grid wherein the heat loss from the waffle grid, caused by convection of air under the border of the sandwich grid, is reduced.

A further object of this invention is to provide a sandwich grid wherein, by reducing the heat losses at the border, the temperature gradient over the toasting portion of the sandwich grid is maintained as uniform as possible.

Still another object of this invention is to provide a sandwich grid wherein the toasting time of the sandwich is considerably reduced.

With these and other objects in view, my invention consists in the construction, arrangement, and combination of the various parts of my device whereby the objects contemplated are attained, as hereinafter more fully set forth, pointed out in my claims, and illustrated in the accompanying drawings, wherein:

Figure 1 is a top plan view of the sandwich grid;

Figure 2 is a cross section view of a pair of opposed sandwich grids mounted on waffle grids and is taken substantially on line 2—2 of Figure 1;

Figure 3 is a cross section similar to Figure 2 and is taken on line 3—3 of Figure 1;

Figure 4 is an enlarged detail view of a rib on the sandwich grid positioned in the overflow gutter of the waffle grid.

Referring now to Figure 1 there is shown a sandwich grid generally designated by numeral 10. This sandwich grid 10 may be made of sheet metal, or may be a casting, and comprises a central portion 12 and a border or edge portion 14.

Referring to the use of the sandwich grid 10 with a waffle iron grid, Figures 2 and 3 show a waffle iron grid 16 positioned in a casing member 18. The waffle grid 16 includes a plurality of pyramids 20 having faces 21, which, when viewed from above, give a grid-like appearance. The waffle grid 16 also includes an edge portion 22 which lies in a plane parallel to and spaced from the faces 21 of the pyramids 20. These edge portions 22 engage each other when the waffle iron is being used to make waffles, thus spacing the faces 21 of opposite waffle grids from each other.

Adjacent the edge portions 22, and formed in the waffle iron grid 16, is an overflow gutter 24 which runs continuously around the waffle iron grid. A portion of the waffle iron grid 16 between the overflow gutter 24 and the pyramids 20 is designated at 26 and terminates in a plane spaced substantially midway between the faces 21 of the waffle iron grid pyramids 20 and the face of edge portion 22.

Referring back to the sandwich grid 10, the central portion 12 is adapted to lie against or as close as possible to the faces 21 of the pyramids 20. The border or edge portion 14 lies in a plane spaced from the plane of central portion 12 so as to provide clearance between the border 14 and the portions 26 and 22 of the waffle iron grid which are spaced from the plane of the pyramid faces 21.

Formed in border 14 are a pair of embossments or bosses 28 which are adapted to engage similar bosses in an oppositely facing sandwich grid to space the sandwich grids apart as best shown in Figure 3. These bosses 28 include bearing strips 30 which are spaced from the plane of the central portion 12 of the sandwich grid a distance equal to substantially half the thickness of an ordinary sized sandwich.

Also embossed in border 14 are a pair of ribs 32 which are adapted to extend into the overflow gutter 24 of the waffle iron grid upon which the sandwich grid is mounted. These ribs 32 extend in a direction generally opposite to the direction of the embossments 28. The ribs 32 extend generally from adjacent one end of one embossment 28 to the end of the next embossment 28. The embossments 32 extend over the entire portion of the border 14 except for that portion wherein embossments 28 are located.

The ribs 32 when positioned in the overflow gutter 24 cooperate with the bounding wall of the overflow gutter 24 to prevent movement of air in and out between the waffle grid and the sandwich grid. The air between the waffle grid 16 and the sandwich grid 10 is substantially sealed therebetween and this reduces the heat losses at the edge of the sandwich grid. This maintains a more uniform heat gradient over the length of the sandwich grid, from the center of the sandwich grid to the outer edges thereof, and thus provides for more uniform toasting of the sandwiches. This also serves to maintain the temperature of the sandwich grid at the highest possible value.

These ribs 32 are adapted to engage a portion of the waffle iron grid bounding the overflow gutter 24 so as to provide a better seal against heat losses due to convection of air. As shown in Figure 4, the overflow gutter 24 is bounded by surface 34 which has a selected radius of curvature; and the ribs 32 have a radius of curvature smaller than the radius of curvature of the overflow gutter. This provides that the ribs 32 will engage the wall 34 of the gutter 24 in substantially a single line indicated at 35 along the length of the rib and preferably at the innermost portion of the overflow gutter so that the central portion 12 of the sandwich grid 10 will be positioned as close as possible to the face 21 of the waffle iron grid.

Means are also provided for removably attaching the sandwich grid to the waffle iron grid, and such means are shown as consisting of spring clips 36 riveted at 38 to a portion of the embossments 28. Since most waffle irons are also provided with dividing ribs, which extend across the face of the waffle iron grid and extend beyond the face plane 21 of the waffle iron grid, the back side of the central portion 12 of the sandwich grid 10 is provided with grooves 40 coined in the back thereof to receive the extending tips of the dividing ribs so as to permit close contact between the central portion 12 and the face 21 of the waffle iron grid.

The result of the use of ribs 32 on the sandwich grid 10 is that the toasting time of sandwiches is reduced to 5 minutes. The comparative results of the different forms of sandwich grids discussed herein showing the toasting time of sandwiches and the temperatures of the sandwich grids is shown in the following tables of experimental results:

*Table I*

| Test No. | Percent Border Bossed | Ribs in Border Extending Into Overflow Gutter | Sandwich Toasting Time (in minutes) |
|---|---|---|---|
| 1 | 0 | No | 7 |
| 2 | 36 | No | 10 |
| 3 | 72 | No | 13 |
| 4 | 36 | Yes | 5 |

*Table II*

| Test No. | Percent Border Bossed | Ribs In Border Extending Into Overflow Gutter | Temperature of Sandwich Grid When Indicator Light Goes Out °F. |
|---|---|---|---|
| 2 | 36 | No | 270 |
| 3 | 72 | No | 267 |
| 4 | 36 | Yes | 276 |

Thus it can be seen that I have provided a sandwich grid wherein heat losses from the waffle iron grid to the air seeping under the border of the sandwich grid is reduced and wherein the heat gradient over the sandwich grid is maintained substantially constant and wherein the toasting time for a sandwich is substantially reduced.

Some changes may be made in the construction and arrangement of the parts of my device without departing from the real spirit and purpose of my invention, and it is my intention to cover by my claims any modified forms of structure or use of mechanical equivalents which may be reasonably included within their scope.

I claim as my invention:

1. In combination with a waffle iron having a pair of opposed grids capable of having their opposed faces parallel when spaced apart, which waffle iron grids each includes an overflow gutter extending continuously around the edge thereof, a pair of similarly shaped sandwich grids each overlying a waffle iron grid, each sandwich grid including a central portion, a border around said central portion overlying said overflow gutter in the waffle iron grid, portions of said border having spaced embossments therein adapted to engage corresponding embossments in opposed sandwich grids, so as to space apart the central portions of the opposed grids, the embossed portions of said border being a minor portion of the length of said border, and the remainder of said border having ribs formed therein extending into said overflow gutter.

2. A waffle iron and sandwich grid combination as set forth in claim 1 wherein the ribs in each sandwich grid extend continuously along said border between successive embossments.

3. In combination with a waffle iron having a pair of opposed grids capable of having their opposed faces parallel when spaced apart, which waffle iron grids each includes an overflow gutter extending continuously around the edge thereof, a pair of similarly shaped sandwich grids each overlying a waffle iron grid, each sandwich grid including a central portion, a border around said central portion overlying said overflow gutter in the waffle iron grid, portions of said border having spaced embossments therein adapted to engage corresponding embossments in opposed sandwich grids, so as to space apart the central portions of the opposed grids, the embossed portions of said border being a minor portion of the length of said border, and the remainder of said border having ribs formed therein extending into said overflow gutter engaging a portion of the wall of said overflow gutter.

4. A waffle iron and sandwich grid combination as set forth in claim 1 wherein the ribs in said sandwich grid engage a portion of the wall of said overflow gutter at substantially the innermost portion thereof.

5. A waffle iron and sandwich grid combination as set forth in claim 1 wherein the overflow gutter in said waffle iron is formed with one radius of curvature, and wherein the ribs on the sandwich grids have a radius of curvature smaller than the radius of curvature of said overflow gutter, whereby said ribs engage said gutter in substantially a single line along the length of said ribs.

6. A waffle iron and sandwich grid combination as set forth in claim 3 including spring clips on the sandwich grid for removably attaching the sandwich grid to the waffle iron grid and for maintaining said ribs in the sandwich grid in contact with the wall of the overflow gutter of the waffle iron overflow gutter.

ANDREW S. KNAPP.

REFERENCES CITED

The following references are of record in the file of this patent:

UNITED STATES PATENTS

| Number | Name | Date |
|---|---|---|
| 1,493,444 | Burch | May 6, 1924 |
| 1,804,196 | Barnes | May 5, 1931 |
| 1,839,112 | Mills | Dec. 29, 1931 |
| 1,900,619 | Snyder | Mar. 7, 1933 |
| 2,018,698 | Allen | Oct. 29, 1935 |
| 2,476,213 | O'Connor | July 12, 1949 |

FOREIGN PATENTS

| Number | Country | Date |
|---|---|---|
| 224,904 | Great Britain | June 11, 1925 |